(12) United States Patent
Lee et al.

(10) Patent No.: US 9,367,188 B2
(45) Date of Patent: Jun. 14, 2016

(54) RC MATCHING IN A TOUCH SCREEN

(71) Applicant: Apple Inc., Cupertino, CA (US)

(72) Inventors: Szu-Hsien Lee, Cupertino, CA (US);
Byung Duk Yang, Cupertino, CA (US);
Chun-Yao Huang, Cupertino, CA (US);
Kyung Wook Kim, Cupertino, CA (US);
Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/286,718

(22) Filed: May 23, 2014

(65) Prior Publication Data

US 2015/0338951 A1     Nov. 26, 2015

(51) Int. Cl.
*G06F 3/044*     (2006.01)

(52) U.S. Cl.
CPC ........... *G06F 3/044* (2013.01); *Y10T 29/49107* (2015.01)

(58) Field of Classification Search
CPC .............. G09G 2320/0223; G09G 2320/0219; G06F 3/044
See application file for complete search history.

(56) References Cited

U.S. PATENT DOCUMENTS

| | | |
|---|---|---|
| 4,542,960 A | 9/1985 | Yang |
| 4,916,308 A | 4/1990 | Meadows |
| 5,105,186 A | 4/1992 | May |
| 5,483,261 A | 1/1996 | Yasutake |
| 5,488,204 A | 1/1996 | Mead et al. |
| 5,550,659 A | 8/1996 | Fujieda et al. |
| 5,680,187 A | 10/1997 | Nagayama et al. |
| 5,825,352 A | 10/1998 | Bisset et al. |
| 5,835,079 A | 11/1998 | Shieh |
| 5,838,308 A | 11/1998 | Knapp et al. |
| 5,844,644 A | 12/1998 | Oh et al. |
| 5,880,411 A | 3/1999 | Gillespie et al. |

(Continued)

FOREIGN PATENT DOCUMENTS

| | | |
|---|---|---|
| CN | 102193253 A | 9/2011 |
| CN | 103488332 A | 1/2014 |

(Continued)

OTHER PUBLICATIONS

Non-Final Office Action mailed May 6, 2015, for U.S. Appl. No. 13/605,918, filed Sep. 6, 2012, eight pages.

(Continued)

*Primary Examiner* — Sahlu Okebato
(74) *Attorney, Agent, or Firm* — Morrison & Foerster LLP

(57) ABSTRACT

A touch screen. In some examples, the touch screen can comprise a first element coupled to a first sense connection, and a second element coupled to a second sense connection. In some examples, the first and second sense connections can be configured such that a load presented by the first sense connection and the first element is substantially equal to a load presented by the second sense connection and the second element. In some examples, the first and second sense connections can comprise detour routing configured such that a resistance of the first sense connection is substantially equal to a resistance of the second sense connection. In some examples, the first and second sense connections can be coupled to dummy routing configured such that a first capacitance presented by the first sense connection is substantially equal to a second capacitance presented by the second sense connection.

33 Claims, 8 Drawing Sheets

(56) References Cited

U.S. PATENT DOCUMENTS

| | | | |
|---|---|---|---|
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |
| 6,281,957 B1 | 8/2001 | Oh et al. |
| 6,310,610 B1 | 10/2001 | Beaton et al. |
| 6,323,846 B1 | 11/2001 | Westerman et al. |
| 6,483,498 B1 | 11/2002 | Colgan et al. |
| 6,501,529 B1 | 12/2002 | Kurihara et al. |
| 6,549,260 B1 | 4/2003 | Shibahara |
| 6,556,265 B1 | 4/2003 | Murade |
| 6,646,706 B2 | 11/2003 | Lim et al. |
| 6,646,707 B2 | 11/2003 | Noh et al. |
| 6,680,448 B2 | 1/2004 | Kawashima et al. |
| 6,690,387 B2 | 2/2004 | Zimmerman et al. |
| 6,762,815 B2 | 7/2004 | Lee |
| 6,975,379 B2 | 12/2005 | Kim et al. |
| 7,015,894 B2 | 3/2006 | Morohoshi |
| 7,042,444 B2 | 5/2006 | Cok |
| 7,133,032 B2 | 11/2006 | Cok |
| 7,184,064 B2 | 2/2007 | Zimmerman et al. |
| 7,202,856 B2 | 4/2007 | Cok |
| 7,230,608 B2 | 6/2007 | Cok |
| 7,280,167 B2 | 10/2007 | Choi et al. |
| 7,379,054 B2 | 5/2008 | Lee |
| 7,633,595 B2 | 12/2009 | Kim et al. |
| 7,663,607 B2 | 2/2010 | Hotelling et al. |
| 7,969,546 B2 | 6/2011 | Wu et al. |
| 8,144,295 B2 | 3/2012 | Chang et al. |
| 8,169,421 B2 | 5/2012 | Wright et al. |
| 8,294,865 B2 | 10/2012 | Chang et al. |
| 8,330,930 B2 | 12/2012 | Matsumori |
| 8,350,826 B2 | 1/2013 | Watanabe |
| 8,479,122 B2 | 7/2013 | Hotelling et al. |
| 8,497,967 B2 | 7/2013 | Chang et al. |
| 8,749,496 B2 | 6/2014 | Chang et al. |
| 8,866,787 B2 | 10/2014 | Chang et al. |
| 2001/0013915 A1 | 8/2001 | Song |
| 2001/0020578 A1 | 9/2001 | Baier |
| 2001/0026347 A1 | 10/2001 | Sawasaki et al. |
| 2002/0084992 A1 | 7/2002 | Agnew |
| 2002/0159016 A1 | 10/2002 | Nishida et al. |
| 2004/0109097 A1 | 6/2004 | Mai |
| 2004/0114082 A1 | 6/2004 | Lee |
| 2004/0120200 A1* | 6/2004 | Gogl et al. ............... 365/210 |
| 2004/0141096 A1 | 7/2004 | Mai |
| 2004/0189587 A1 | 9/2004 | Jung et al. |
| 2005/0052582 A1 | 3/2005 | Mai |
| 2005/0140892 A1 | 6/2005 | Kim et al. |
| 2005/0231487 A1 | 10/2005 | Ming |
| 2005/0243023 A1 | 11/2005 | Reddy et al. |
| 2005/0243228 A1 | 11/2005 | Lee et al. |
| 2005/0264232 A1 | 12/2005 | Choi et al. |
| 2005/0270435 A1 | 12/2005 | Shiau et al. |
| 2006/0007165 A1 | 1/2006 | Yang et al. |
| 2006/0145365 A1 | 7/2006 | Halls et al. |
| 2006/0146033 A1 | 7/2006 | Chen et al. |
| 2006/0146034 A1 | 7/2006 | Chen et al. |
| 2006/0197753 A1 | 9/2006 | Hotelling |
| 2006/0203151 A1 | 9/2006 | Kim |
| 2006/0244736 A1 | 11/2006 | Tseng |
| 2007/0018969 A1 | 1/2007 | Chen et al. |
| 2007/0075977 A1 | 4/2007 | Chen et al. |
| 2007/0097278 A1 | 5/2007 | Rho et al. |
| 2007/0176905 A1 | 8/2007 | Shih et al. |
| 2007/0216657 A1 | 9/2007 | Konicek |
| 2007/0262967 A1 | 11/2007 | Rho |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0067528 A1 | 3/2008 | Choi et al. |
| 2008/0074401 A1 | 3/2008 | Chung et al. |
| 2008/0129898 A1 | 6/2008 | Moon |
| 2008/0136980 A1 | 6/2008 | Rho et al. |
| 2008/0150901 A1 | 6/2008 | Lowles et al. |
| 2008/0158172 A1 | 7/2008 | Hotelling et al. |
| 2008/0309627 A1 | 12/2008 | Hotelling et al. |
| 2008/0309633 A1 | 12/2008 | Hotelling et al. |
| 2009/0273577 A1 | 11/2009 | Chen et al. |
| 2009/0323007 A1 | 12/2009 | Shim |
| 2010/0001973 A1 | 1/2010 | Hotelling et al. |
| 2010/0123866 A1 | 5/2010 | Chang et al. |
| 2010/0144391 A1* | 6/2010 | Chang et al. ............... 455/566 |
| 2010/0149128 A1 | 6/2010 | No et al. |
| 2010/0277425 A1 | 11/2010 | Choi |
| 2011/0012845 A1 | 1/2011 | Rothkopf et al. |
| 2011/0074705 A1 | 3/2011 | Yousefpor et al. |
| 2011/0222016 A1 | 9/2011 | Kaneko et al. |
| 2011/0248949 A1 | 10/2011 | Chang et al. |
| 2011/0298731 A1* | 12/2011 | Fu et al. .................. 345/173 |
| 2012/0019473 A1 | 1/2012 | Edwards |
| 2012/0092273 A1 | 4/2012 | Lyon et al. |
| 2012/0154731 A1 | 6/2012 | Chang et al. |
| 2012/0206395 A1 | 8/2012 | Misaki |
| 2012/0206402 A1 | 8/2012 | Park et al. |
| 2013/0045762 A1 | 2/2013 | Chang et al. |
| 2013/0063891 A1 | 3/2013 | Martisauskas |
| 2013/0093721 A1* | 4/2013 | Nakamura et al. ............ 345/174 |
| 2013/0113734 A1 | 5/2013 | Cho et al. |
| 2013/0113752 A1 | 5/2013 | Chang et al. |
| 2013/0329150 A1 | 12/2013 | Kim |
| 2014/0028618 A1 | 1/2014 | Chang et al. |
| 2014/0139480 A1 | 5/2014 | Seo et al. |
| 2014/0240286 A1 | 8/2014 | Chang et al. |

FOREIGN PATENT DOCUMENTS

| | | |
|---|---|---|
| CN | 203422722 U | 2/2014 |
| CN | 203480484 U | 3/2014 |
| EP | 1 133 057 A2 | 9/2001 |
| EP | 1 133 057 A3 | 9/2001 |
| EP | 1 133 057 B1 | 9/2001 |
| EP | 1 422 601 A1 | 5/2004 |
| EP | 1 455 264 A2 | 9/2004 |
| EP | 1 455 264 A3 | 9/2004 |
| EP | 1 939 673 A1 | 7/2008 |
| GB | 24562221 A | 7/2009 |
| GB | 2 475 054 A | 5/2011 |
| JP | 07-036017 A | 2/1995 |
| JP | 2000-163031 A | 6/2000 |
| JP | 2002-342033 A | 11/2002 |
| KR | 10-2001-0083106 A | 8/2001 |
| KR | 10-2005-0070367 A | 7/2005 |
| WO | WO-85/03374 A1 | 8/1985 |
| WO | WO-2004/046905 A2 | 6/2004 |
| WO | WO-2004/046905 A3 | 6/2004 |
| WO | WO-2005/036510 A1 | 4/2005 |
| WO | WO-2007/146785 A2 | 12/2007 |
| WO | WO-2007/146785 A3 | 12/2007 |
| WO | WO-2010/065424 A2 | 6/2010 |
| WO | WO-2012/065424 A3 | 6/2010 |
| WO | WO-2013/184597 A1 | 12/2013 |
| WO | WO-2015/160377 A1 | 10/2015 |
| WO | WO-2015/183334 A1 | 12/2015 |

OTHER PUBLICATIONS

ROC (Taiwan) search report mailed Mar. 27, 2015, for TW Patent Application No. 102119986, with English translation, two pages.

Non-Final Office Action mailed May 23, 2014, for U.S. Appl. No. 13/605,918, filed Sep. 6, 2012, seven pages.

Non-Final Office Action mailed Jul. 9, 2014, for U.S. Appl. No. 14/268,911, filed May 2, 2014, six pages.

International Search Report mailed Jan. 22, 2015, for PCT Application No. PCT/US14/58701, filed Oct. 1, 2014, 2014, two pages.

Notice of Allowance mailed Aug. 13, 2014, for U.S. Appl. No. 14/268,911, filed May 2, 2014, five pages.

Final Office Action mailed Nov. 19, 2014, for U.S. Appl. No. 13/605,918, filed Sep. 6, 2012, eight pages.

International Search Report mailed Dec. 15, 2014, for PCT Application No. PCT/US14/57032, filed Sep. 23, 2014, three pages.

Final Office Action mailed Jul. 14, 2011, for U.S. Appl. No. 12/340,567, filed Dec. 19, 2008, eight pages.

(56) References Cited

OTHER PUBLICATIONS

Final Office Action mailed Aug. 22, 2012, for U.S. Appl. No. 12/315,869, filed Dec. 5, 2008, 13 pages.
International Search Report mailed Nov. 12, 2010, for PCT Application No. PCT/US2009/065978, four pages.
International Search Report mailed Sep. 17, 2013, for PCT Application No. PCT/US2013/043938, filed Jun. 3, 2013, five pages.
Kanda, E. et al. (2008). "55.2: Integrated Active Matrix Capacitive Sensors for Touch Panel LTPS-TFT LCDs," *SID 08 Digest*, pp. 834-837.
Lee, S. et al. (Oct. 2, 2002). "Ultra-FFS TFT-LCD with Super Image Quality, Fast Response Time, and Strong Pressure-Resistant Characteristics," *Journal of SID* pp. 117-122.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Feb. 14, 2011, for U.S. Appl. No. 12/340,567, filed Dec. 19, 2008, nine pages.
Non-Final Office Action mailed May 15, 2012, for U.S. Appl. No. 12/315,869, filed Dec. 5, 2008, 14 pages.
Non-Final Office Action mailed Dec. 3, 2012, for U.S. Appl. No. 13/656,580, filed Oct. 19, 2012, seven pages.
Non-Final Office Action mailed Oct. 23, 2013, for U.S. Appl. No. 12/315,869, filed Dec. 5, 2008, six pages.
Notice of Allowance mailed Jan. 17, 2012, for U.S. Appl. No. 12/340,567, filed Dec. 19, 2008, 10 pages.
Notice of Allowance mailed Aug. 6, 2012, for U.S. Appl. No. 13/405,226, filed Feb. 24, 2012, seven pages.
Notice of Allowance mailed Apr. 30, 2013, for U.S. Appl. No. 13/656,580, filed Oct. 19, 2012, nine pages.
Notice of Allowance mailed Feb. 7, 2014, for U.S. Appl. No. 12/315,869, filed Dec. 5, 2008, five pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Nov. 24, 2015, for U.S. Appl. No. 13/605,918, filed Sep. 6, 2012, seven pages.
Non-Final Office Action mailed Oct. 15, 2015, for U.S. Appl. No. 13/605,918, filed Sep. 6, 2012, seven pages.

\* cited by examiner

RC MATCHING IN A TOUCH SCREEN

FIELD OF THE DISCLOSURE

This relates generally to touch sensor panels, and more particularly to balancing loads presented by connections in a touch screen.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Touch events can be sensed on the above touch sensor panels by detecting changes in the self-capacitance and/or mutual capacitance of the above conductive plates. In order to detect such changes, in some examples, the conductive plates can be coupled to sense circuitry using sense connections. It can be beneficial for the resistances and/or capacitances of these sense connections to be substantially uniform across the touch screen so that transient operation of the sense connections can be substantially uniform across the touch screen. The examples of the disclosure provide various techniques for balancing the resistances and/or capacitances of these sense connections.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Touch events can be sensed on the above touch sensor panels by detecting changes in the self-capacitance and/or mutual capacitance of the above conductive plates. In order to detect such changes, in some examples, the conductive plates can be coupled to sense circuitry using sense connections. It can be beneficial for the resistances and/or capacitances of these sense connections to be substantially uniform across the touch screen so that transient operation of the sense connections can be substantially uniform across the touch screen. The examples of the disclosure provide various techniques for balancing the resistances and/or capacitances of these sense connections.

Figure 1A:
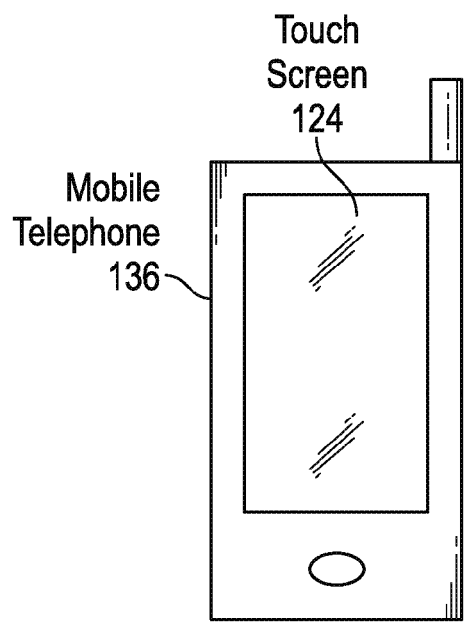
FIGS. 1A-1D illustrate an example mobile telephone, an example media player, an example personal computer and an example tablet computer that can each include an exemplary touch screen according to examples of the disclosure.
Figure 1B:
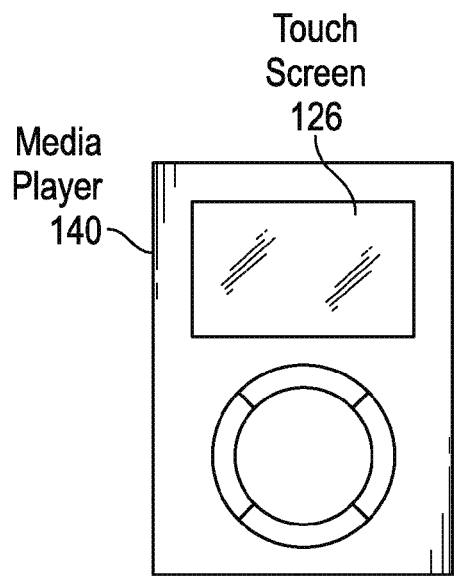
Figure 1C:
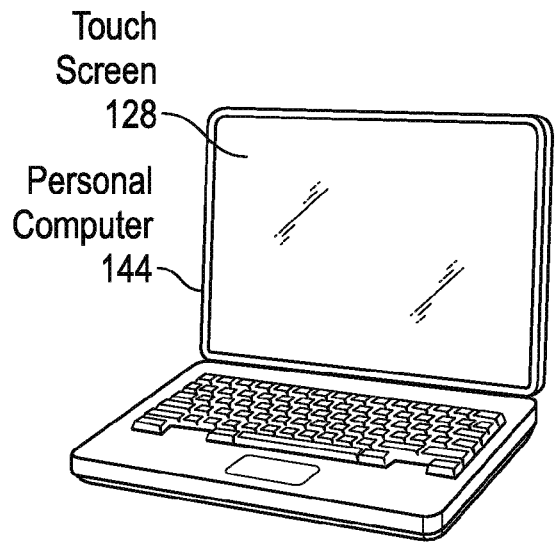
Figure 1D:
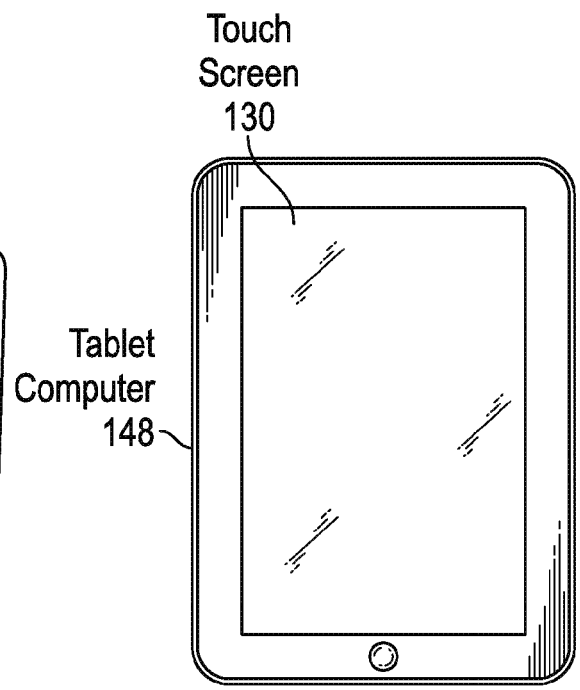

FIGS. 1A-1D show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small plates of conductive material that can be referred to as a touch pixel or a touch pixel electrode. For example, a touch screen can include a plurality of touch pixels, each touch pixel corresponding to a particular location on the touch screen at which touch or proximity (i.e., a touch or proximity event) is to be sensed. Such a touch screen can be referred to as a pixelated self-capacitance touch screen. During operation, the touch pixel can be stimulated with an AC waveform, and the self-capacitance of the touch pixel can be measured. As an object approaches the touch pixel, the self-capacitance of the touch pixel can change. This change in the self-capacitance of the touch pixel can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance of the rows and columns can be detected, similar to above.

In some examples, touch screens 124, 126, 128 and 130 can be based on mutual capacitance. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, capacitive touch, etc.

Figure 2:
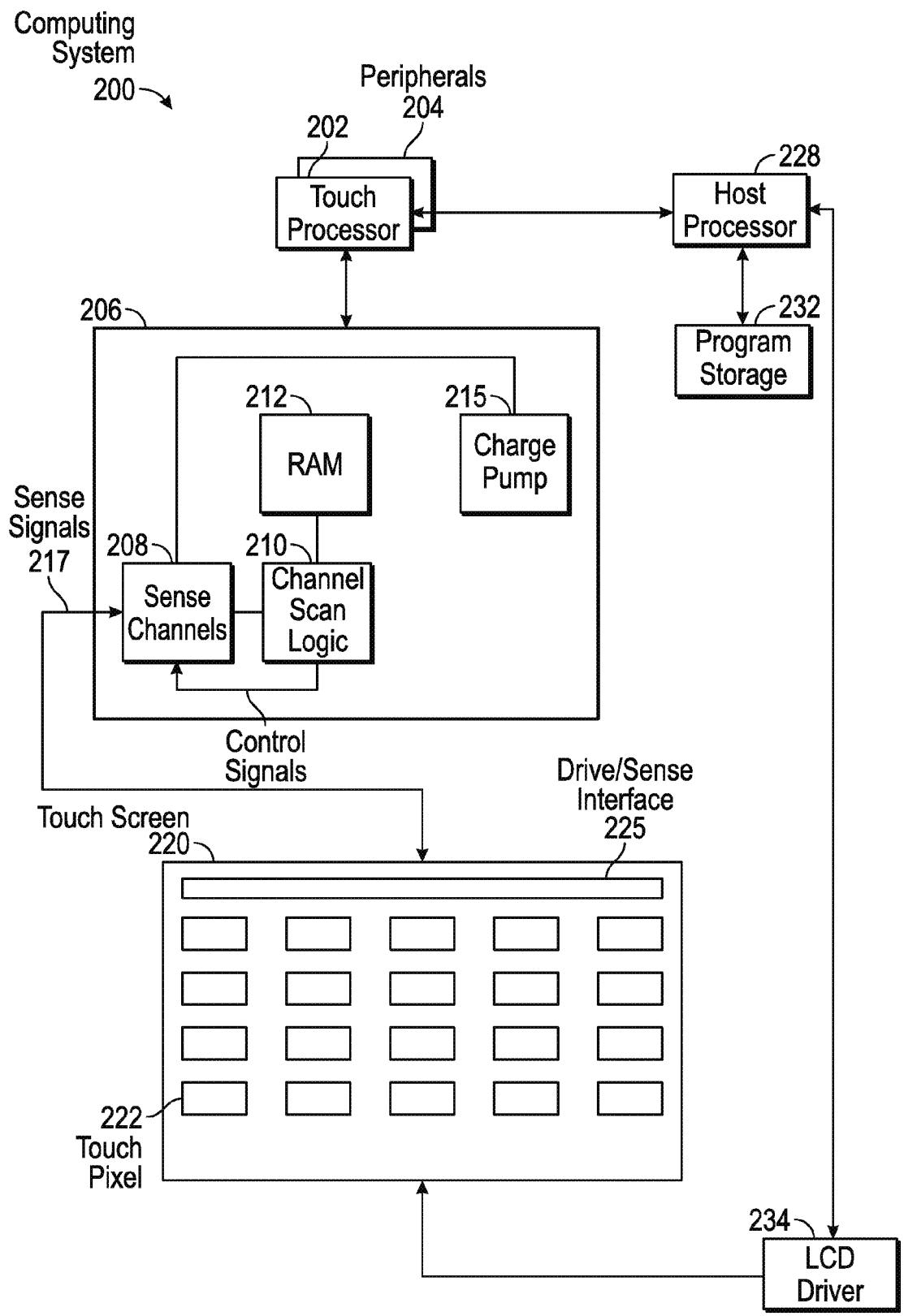
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen, and can include touch sensing circuitry that can include a capacitive sensing medium having a plurality of touch pixels 222 (e.g., a pixelated self-capacitance touch screen). It is understood that while touch screen 220 is described herein as including touch pixels 222, the touch screen can additionally or alternatively include rows and columns of conductive material; the operation of such a touch screen would be similar to that described here. Additionally, it is understood that in some examples, touch screen 220 can be a mutual capacitance touch screen, as described above, though the description that follows will assume that the touch screen is a self-capacitance touch screen having a plurality of touch pixel electrodes ("touch pixels"). Touch pixels 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixels 222) as "touch pixels" can be particularly useful when touch screen 220 is viewed as capturing an "image" of touch. In other words, after touch controller 206 has determined an amount of touch detected at each touch pixel 222 in touch screen 220, the pattern of touch pixels in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described above, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
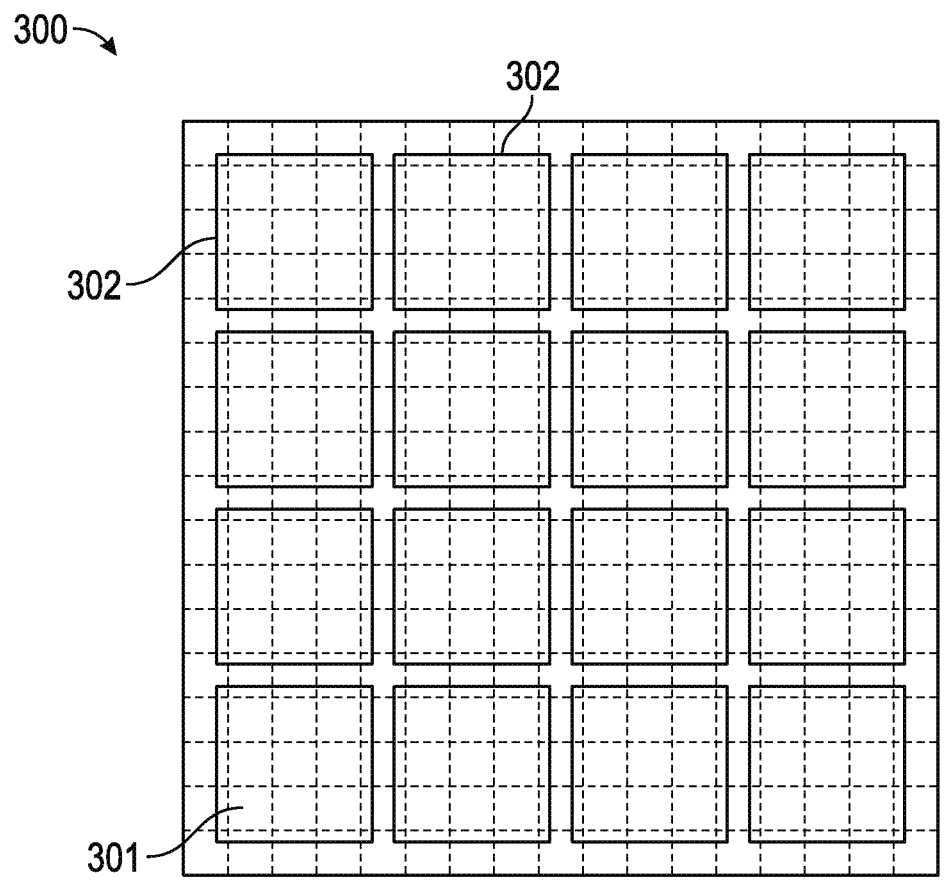
FIG. 3 illustrates an example configuration in which common electrodes can form portions of the touch sensing circuitry of a touch sensing system.

In some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., OLED displays), such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 3 illustrates an example configuration in which common electrodes 302 can form portions of the touch sensing circuitry of a touch sensing system—in some examples of this disclosure, the common electrodes can form touch pixels used to detect an image of touch on touch screen 300, as described above. Each common electrode 302 (i.e., touch pixel) can include a plurality of display pixels 301, and each display pixel 301 can include a portion of a common electrode 302, which can be a circuit element of the display system circuitry in the display pixel stackup (i.e., the stacked material layers forming the display pixels) of the display pixels of some types of LCD or other displays that can operate as part of the display system to display an image.

In the example shown in FIG. 3, each common electrode 302 can serve as a multi-function circuit element that can operate as display circuitry of the display system of touch screen 300 and can also operate as touch sensing circuitry of the touch sensing system. In this example, each common electrode 302 can operate as a common electrode of the display circuitry of the touch screen 300, as described above, and can also operate as touch sensing circuitry of the touch screen. For example, a common electrode 302 can operate as a capacitive part of a touch pixel of the touch sensing circuitry during the touch sensing phase. Other circuit elements of touch screen 300 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel in an "off" state. Stimulation signals can be applied to common electrode 302. Changes in the total self-capacitance of common electrode 302 can be sensed through an operational amplifier, as previously discussed. The change in the total self-capacitance of common electrode 302 can depend on the proximity of a touch object, such as a finger, to the common electrode. In this way, the measured change in total self-capacitance of common electrode 302 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 302 (i.e., touch pixels) and display pixels 301 of FIG. 3 are shown as rectangular or square regions on touch screen 300. However, it is understood that the common electrodes 302 and display pixels 301 are not limited to the shapes, orientations, and positions shown, but can include any suitable configurations according to examples of the disclosure.

As described above, the self-capacitance of each touch pixel (e.g., touch pixel 222) in the touch screen of the disclosure can be sensed to capture an image of touch across the touch screen. To allow for the sensing of the self-capacitance of individual touch pixels, it can be necessary to route one or more electrical connections between each of the touch pixels and the touch sensing circuitry (e.g., sense channels 208) of the touch screen.

Figure 4:
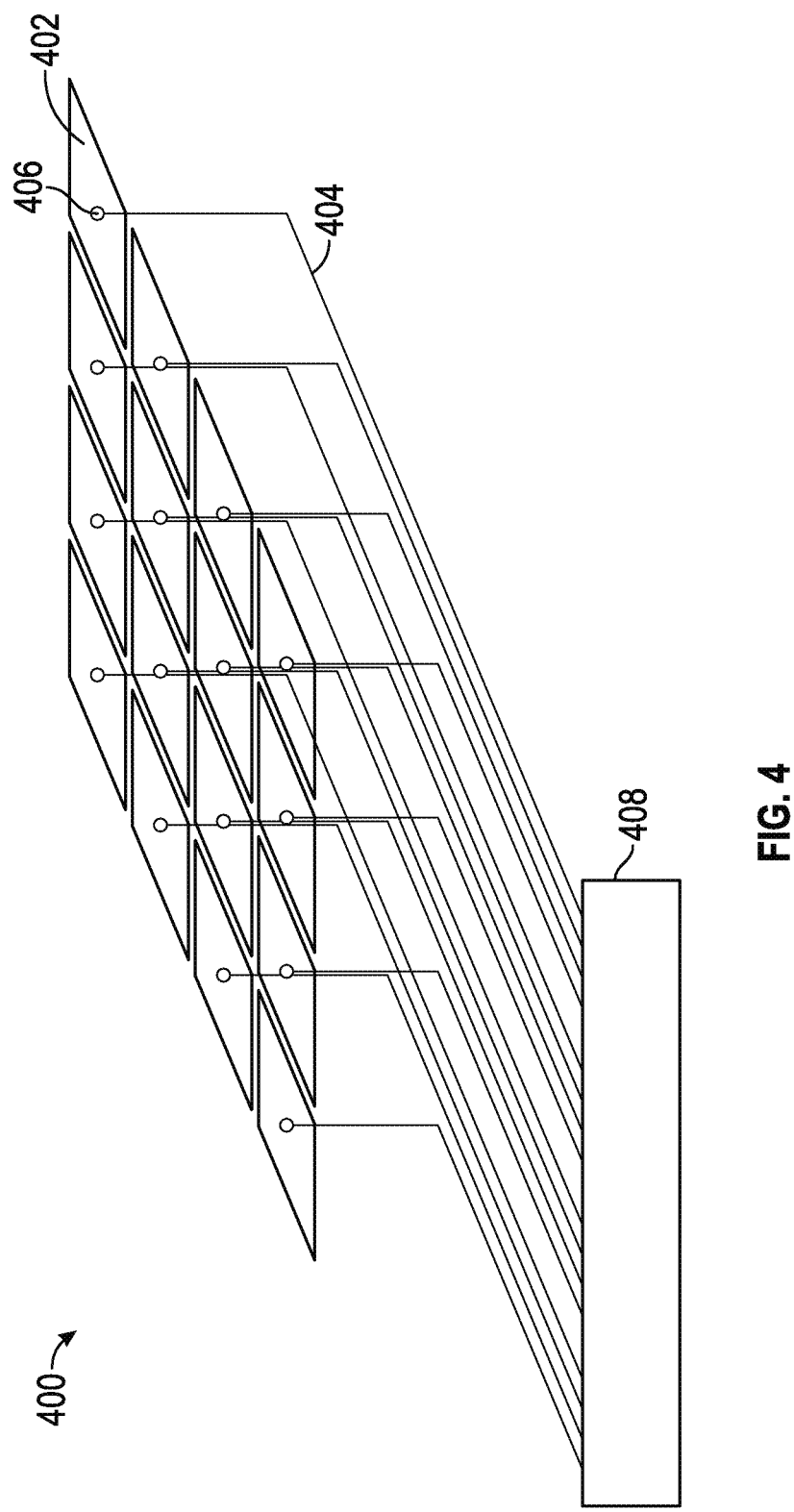
FIG. 4 illustrates an exemplary configuration for electrically connecting touch pixels in touch screen to sense channels according to examples of the disclosure.

FIG. 4 illustrates an exemplary configuration for electrically connecting touch pixels 402 in touch screen 400 to sense channels 408 according to examples of the disclosure. In some examples, sense channels 408 can be located in a touch controller separate from the touch screen, but in some examples, the sense channels can be located on the touch screen. Touch screen 400 can include touch pixels 402, as described above. Components of touch screen 400 other than touch pixels 402 are not illustrated for ease of description. Each of touch pixels 402 can be electrically connected to sense channels 408 through sense connections 404 and connection points 406. In some examples, sense connections 404 can connect touch pixels 402 to a location on the touch screen (e.g., a flex circuit connection area) from which a separate connection (e.g., a flex circuit) can complete the connection to sense channels 408 (e.g., when the sense channels are located separate from touch screen 400). In some examples, sense connections 404 can connect touch pixels 402 directly to sense channels 408 (e.g., when the sense channels are located on touch screen 400). In some examples, connection points 406 can be vias when sense connections 404 and touch pixels 402 reside in different layers of touch screen 400 (e.g., when the sense connections reside underneath the touch pixels, or when the sense connections reside on top of the touch pixels); it is understood, however, that in some examples, the sense connections and the touch pixels can reside in the same layer of the touch screen, and the connection points can represent a location where the sense connections and the touch pixels connect. As discussed above, in some examples, connection points 406 can allow for an electrical connection between touch pixels 402 and sense connections 404 through one or more intervening layers that may exist between the touch pixels and the sense connections in touch screen 400.

In connecting sense channels 408 and touch pixels 402, it can be beneficial to balance the load (e.g., the resistance and/or the capacitance) that each sense connection 404 presents to the sense channels so that the transient operation of the sense connections can be substantially uniform across touch screen 400 (e.g., an RC time constant for each sense connection can be substantially the same). The examples of the disclosure are directed to various techniques for achieving the above load balancing.

Although the examples of the disclosure are presented in the context of connecting touch pixels to sense channels, it is understood that the techniques described can be utilized in any context in which load balancing of connections between components can be desired (e.g., connecting mutual capacitance drive lines to drive circuitry).

Figure 5:
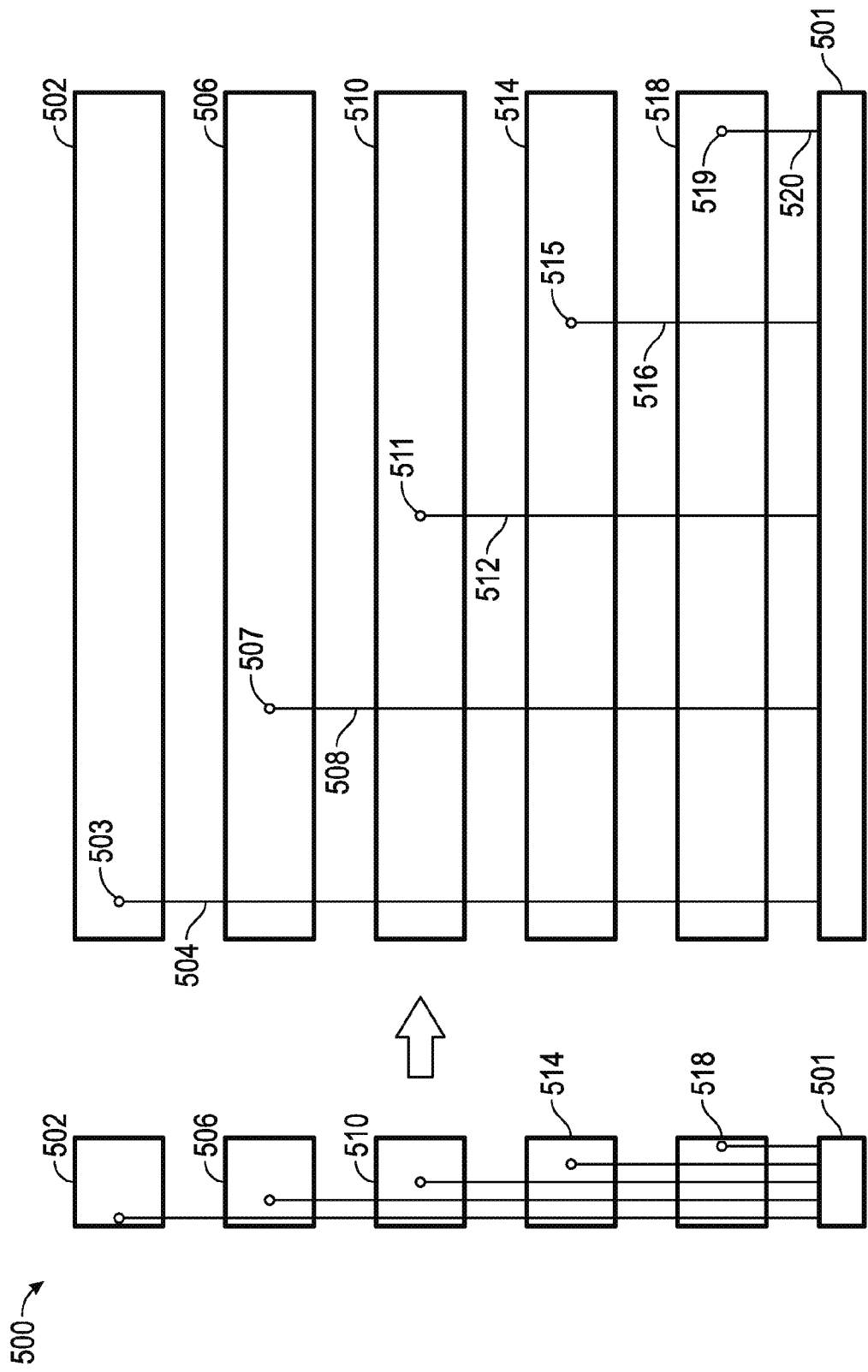
FIG. 5 illustrates an exemplary sense connection configuration according to examples of the disclosure.

FIG. 5 illustrates an exemplary sense connection configuration 500 according to examples of the disclosure. Touch pixels 502, 506, 510, 514 and 518 can correspond to a column of touch pixels 402 on touch screen 400 in FIG. 4, for example. Touch pixels 502, 506, 510, 514 and 518 are illustrated as being expanded in the horizontal dimension for ease of illustration. Each touch pixel can be coupled to sense channels 501 through respective connection points and sense connections—e.g., touch pixel 502 can be coupled to the sense channels through connection point 503 and sense connection 504. The remaining touch pixels can be similarly coupled to sense channels 501, as illustrated. Sense connections 504, 508, 512, 516 and 520 can correspond to sense connections 404, and connection points 503, 507, 511, 515 and 519 can correspond to connection points 406, for example.

The load (e.g., the resistance and/or the capacitance) presented by each sense connection to sense channels 501 in the illustrated example will now be described. As an initial matter, each sense connection in the illustrated example can have a different resistance, because, assuming each sense connection is formed of the same material having the same width/depth, each sense connection can be required to travel different distances. For example, sense connection 504 can travel the longest distance of the illustrated sense connections, because touch pixel 502 can be the furthest touch pixel of the illustrated touch pixels from sense channels 501. On the other hand, sense connection 520 can travel the shortest distance because touch pixel 518 can be the closest touch pixel to sense channels 501. Thus, sense connection 504 can have the highest resistance of the illustrated sense connections, sense connection 520 can have the lowest resistance of the illustrated sense connections, and the remaining sense connections can have resistances between those of sense connection 504 and sense connection 520 based on the respective traveling distance of each.

In contrast to the different resistances of the sense connections, the capacitances presented by each sense connection to sense channels 501 can be substantially balanced in the illustrated example. In the discussions that follow, the capacitance presented by a sense connection to sense channels 501 will be considered to include: 1) capacitances resulting from overlap of the sense connection with touch pixels other than the touch pixel to which the sense connection is coupled, and 2) capacitances resulting from overlap of the touch pixel to which the sense connection is coupled with other sense connections. Capacitances between sense connections can be relatively small, and thus not considered in this discussion, because the sense connections can be spaced relatively far apart from each other.

Considering first the capacitance presented by sense connection 504 to sense channels 501, the capacitance presented can be approximately 4C, where C can represent a capacitance resulting from the overlap of a sense connection with a touch pixel. Specifically, sense connection 504 can overlap touch pixels 506, 510, 514 and 518 before connecting to touch pixel 502 at connection point 503. Touch pixel 502, in the illustrated example, does not overlap with any sense connections, and thus may not contribute to the capacitance presented by sense connection 504 to sense channels 501.

Sense connection 508 can also present a capacitance of approximately 4C to sense channels 501. Specifically, sense connection 508 can overlap with touch pixels 510, 514 and 518 before connecting to touch pixel 506 at connection point 503, which can account for a capacitance of approximately 3C. Additionally, touch pixel 506, to which sense connection 508 can be coupled, can overlap with sense connection 504, which can account for an additional capacitance of approximately 1C. Thus, the total capacitance presented by sense connection 508 to sense channels 501 can be approximately 4C, which can be the same capacitance presented by sense connection 504 to the sense channels. The total capacitances presented by the remaining sense connections to sense channels 501 can similarly be approximately 4C.

Therefore, in the illustrated sense connection configuration 500, the resistance of each sense connection can be different, whereas the capacitance presented by each sense connection to sense channels 501 can be substantially the same. As discussed above, it can be beneficial to also make the resistances of the sense connections substantially equal.

Figure 6:
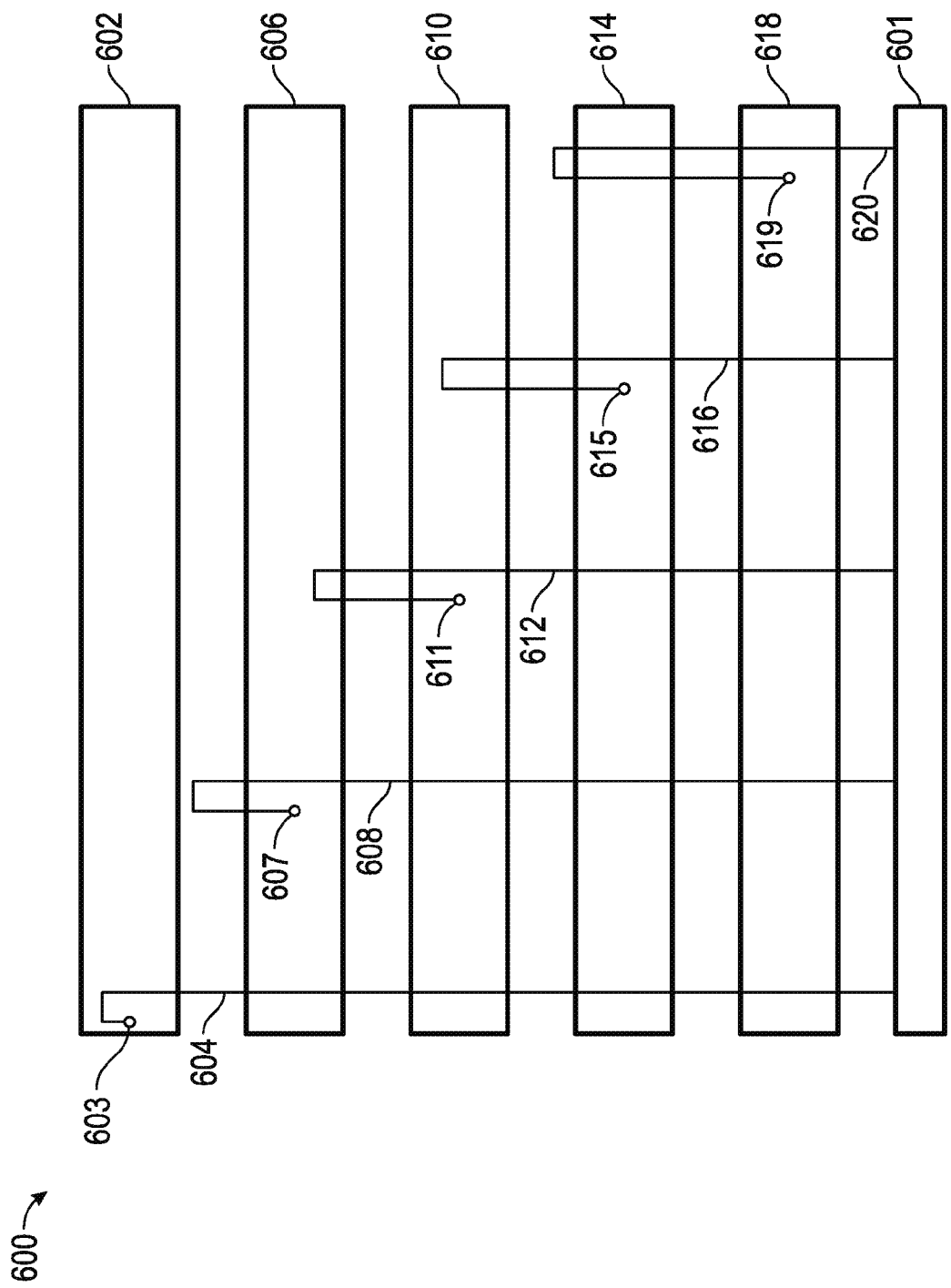
FIG. 6 illustrates an exemplary sense connection configuration in which the resistances of the sense connections can be substantially equal.

FIG. 6 illustrates an exemplary sense connection configuration 600 in which the resistances of the sense connections can be substantially equal. Sense connection configuration 600 can be similar to sense connection configuration 500, except that the sense connections can include detour routing such that the total traveling length of each sense connection can be substantially the same as the total traveling length of the other sense connections. In this way, the total resistance of each sense connection can be substantially the same as the total resistance of the other sense connections.

Specifically, the resistance of sense connection 604 can be the target resistance for the other sense connections to reach, because sense connection 604 can necessarily be the longest sense connection as it can be required to reach touch pixel 602 from sense channels 601. In other words, it can be the case that the resistance of sense connection 604 cannot be substantially reduced by reducing the length of the sense connection, as the length of the sense connection can be limited by the distance of touch pixel 602 from sense channels 601. It is understood that while sense connection 604 is illustrated as including detour routing similar to the other sense connections in sense connection configuration 600, sense connection 604 need not include such detour routing.

In order to substantially match the length (and thus the resistance) of sense connection 604, the other sense connections can include detour routing to make their total length substantially the same as the length of sense connection 604. For example, sense connection 608 can extend beyond connection point 607 and turn back towards the connection point at an appropriate location such that the total length of the sense connection can be substantially the same as the total length of sense connection 604. The remaining sense connections can similarly include such detour routing to make their lengths substantially the same as the length of sense connection 604. As such, the resistances of the sense connections can be made substantially equal. The illustrated detour routing configuration is merely exemplary, and it is understood that other routing configurations in which the lengths of the sense connections are substantially equalized are within the scope of the disclosure. Further, in some examples, instead of adjusting sense connection length, other characteristics of the sense connections (e.g., widths, thicknesses, materials, and/or any other characteristics) can be adjusted to achieve the goals of balancing the resistances and/or the capacitances associated with the sense connections—however, for ease of description, the examples of the disclosure will focus on load balancing techniques for sense connections made of the same material, having the same width, etc.

Balancing the resistances of the sense connections in sense connection configuration 600 as described above can cause the capacitances presented by those sense connections to sense channels 601 to become unbalanced. For example, the capacitance presented by sense connection 612 to sense channels 601 can be a combination of: 1) 4C, as before, 2) an additional capacitance resulting from the overlap of the detour routing of the sense connection with touch pixel 606, and 3) an additional capacitance resulting from the overlap of the detour routing of sense connection 616 with touch pixel 610. In contrast, the capacitance presented by sense connection 604 to sense channels 601 can remain at 4C, as before. Such differences in capacitances resulting from detour routing-touch pixel overlap can similarly exist in the remaining sense connections. Therefore, while the resistances of the sense connections in sense connection configuration 600 can be substantially balanced, the capacitances that the sense connections present to sense channels 601 can be unbalanced.

Figure 7:
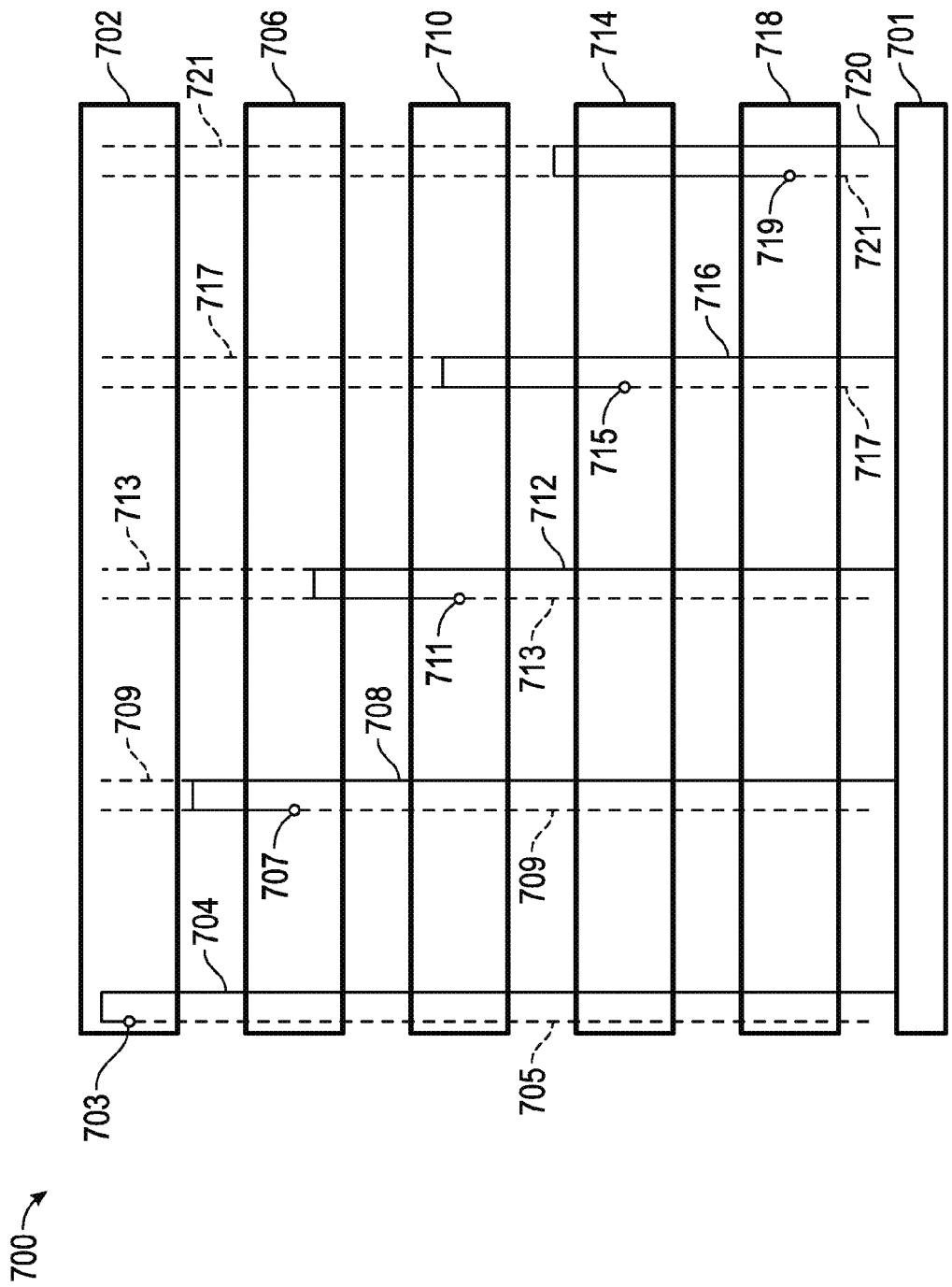
FIG. 7 illustrates an exemplary sense connection configuration in which the resistances and the capacitances of the sense connections can be substantially equal.

FIG. 7 illustrates an exemplary sense connection configuration 700 in which the resistances and the capacitances of the sense connections can be substantially equal. Sense connection configuration 700 can be similar to sense connection configuration 600, except that the sense connections can be electrically coupled to dummy routing, illustrated as dashed lines, such that the total sense connection-touch pixel overlap for each sense connection can be substantially the same as the total sense connection-touch pixel overlap for other sense connections. Additionally, because the sense connections can include the same detour routing as in sense connection configuration 600, and because the ends of the dummy routing can be open-circuited (i.e., configured in such a way as to prevent current from flowing through the dummy routing), the resistances of the sense connections can also be substantially equal.

For example, sense connection 704 can have the same resistance as sense connection 604. While sense connection 704 can include dummy routing 705 that can be electrically connected to the sense connection at connection point 703, substantially no current may flow through the dummy routing because the end of the dummy routing can be open-circuited. Thus, the resistance of sense connection 704 from sense channels 701 to touch pixel 702 can be substantially the same as the resistance of sense connection 604. This can be true for the remaining sense connections in sense connection configuration 700 as well. Thus, the resistances of the sense connections can be substantially equal, as above.

The capacitance that sense connection 704 can present to sense channels 701 can, however, differ from the capacitance that sense connection 604 can present to sense channels 601. In particular, the capacitance presented by sense connection 704 to sense channels 701 can be approximately 16C-4C resulting from sense connection-touch pixel overlap (overlap with touch pixels 706, 710, 714 and 718), 4C resulting from dummy routing 705-touch pixel overlap (overlap with touch pixels 706, 710, 714 and 718), and 8C resulting from overlap of the dummy routing for each of the other sense connections with touch pixel 702.

The capacitance that sense connection 708 can present to sense channels 701 can also be approximately 16C-3C resulting from sense connection-touch pixel overlap (overlap with touch pixels 710, 714 and 718), 5C resulting from dummy routing 709-touch pixel overlap (overlap with touch pixels 702, 710, 714 and 718), and 8C resulting from overlap of each of the other sense connections and/or their associated dummy routing with touch pixel 706. The capacitances that the remaining sense connections can present to sense channels 701 can similarly be approximately 16C.

Therefore, in the illustrated sense connection configuration 700, the resistance of each sense connection can be substantially the same, and the capacitance presented by each sense connection to sense channels 701 can also be substantially the same. As such, the RC time constants of the sense connections can be substantially uniform across the touch screen. The illustrated dummy routing configuration is merely exemplary, and it is understood that other dummy routing configurations in which the sense connection-touch pixel overlaps of the sense connections are substantially equalized are within the scope of the disclosure.

Figure 8:
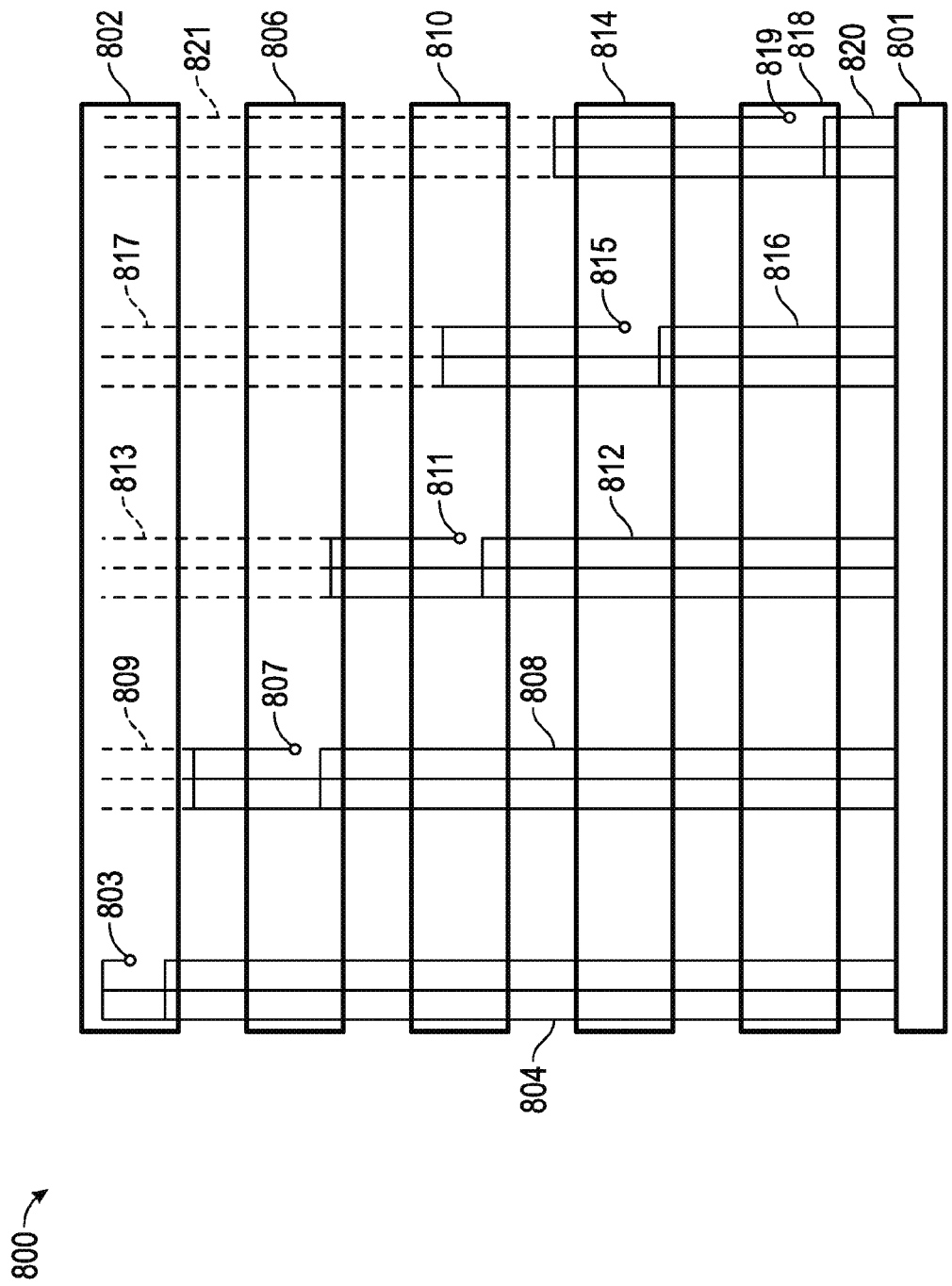
FIG. 8 illustrates another exemplary sense connection configuration in which the resistances and the capacitances of the sense connections can be substantially equal.

FIG. 8 illustrates another exemplary sense connection configuration 800 in which the resistances and the capacitances of the sense connections can be substantially equal. The sense connections in sense connection configuration 800 can be electrically coupled to extra lines (e.g., dummy routing) to equalize the capacitances of the sense connections, similar to the dummy routing in sense connection configuration 700. However, the sense connections in sense connection configuration 800 can utilize some of the extra lines that are used to equalize capacitances to also reduce the resistances of the sense connections in a substantially equal manner across the touch screen. Thus, the capacitances and the resistances of the sense connections can remain substantially balanced, while the absolute values of the resistances of the sense connections can be reduced.

In the illustrated example, the capacitance presented by each sense connection to sense channels 801 can be approximately 24C, for reasons similar to those described previously. The details are omitted here for brevity. Therefore, the capacitances presented by each sense connection to sense channels 801 can be substantially the same.

The resistance of sense connection 804 can be substantially less than the resistance of sense connection 704, because sense connection 804 can utilize: 1) three lines to carry one or more signals to a location slightly before connection point 803, 2) two lines to carry the one or more signals through part of the detour routing associated with sense connection 804, and 3) one line to carry the one or more signals the remaining distance to the connection point and touch pixel 802. Sense connection 704, on the other hand, can utilize only a single line to carry the one or more signals to connection point 703 and touch pixel 702. Therefore, the resistance of sense connection 804 can be substantially less than the resistance of sense connection 704—in some examples, anywhere from 30% to 70% less.

The length and configuration of the detour routing for each sense connection can be set to ensure that the total resistances of the sense connections are substantially the same, similar to as described above with respect to FIG. 6. In the illustrated example, this can be accomplished by adjusting the length of the double-line and single-line portions of the detour routing.

As such, in the illustrated sense connection configuration 800, the resistance of each sense connection can be substantially the same, and the capacitance presented by each sense connection to sense channels 801 can also be substantially the same. Additionally, the absolute values of the resistances of the sense connections can be reduced as compared with the sense connections in FIGS. 5-7, which, in some examples, can offset any increase in sense connection capacitance that may result from increased overlaps between sense connections/dummy routing and touch pixels due to the use of extra lines. As a result, the RC time constants associated with the sense connections can be reduced while also substantially maintaining the uniformity of the RC time constants across the touch screen. The illustrated sense connection routing configuration (sense connection and detour routing) is merely exemplary, and it is understood that other routing configurations in which the resistances of the sense connections are reduced and substantially equalized are within the scope of the disclosure. The illustrated dummy routing configuration is also merely exemplary, and it is understood that other dummy routing configurations in which the sense connection capacitances are substantially equalized are also within the scope of the disclosure.

Thus, the examples of the disclosure provide one or more configurations for balancing and/or reducing the resistive and/or capacitive load seen by drive and/or sense circuitry in a touch screen.

Therefore, according to the above, some examples of the disclosure are directed to a touch screen comprising a first element of a plurality of elements, the first element coupled to a first sense connection; and a second element of the plurality of elements, the second element coupled to a second sense connection, wherein the first and second sense connections are configured such that a load presented by the first sense connection and the first element is substantially equal to a load presented by the second sense connection and the second element. Additionally or alternatively to one or more of the examples disclosed above, in some examples, the touch screen comprises a self-capacitance touch screen, and the first and second elements comprise distinct touch pixel electrodes of the self-capacitance touch screen. Additionally or alternatively to one or more of the examples disclosed above, in some examples, the first sense connection and the second sense connection are configured to couple the first element and the second element, respectively, to a location on the touch screen, and the first element is disposed a first distance from the location on the touch screen, and the second element is disposed a second distance from the location on the touch screen, the first distance being different than the second distance. Additionally or alternatively to one or more of the examples disclosed above, in some examples, the location comprises a flex circuit connection area. Additionally or alternatively to one or more of the examples disclosed above, in some examples, the location comprises sense channels. Additionally or alternatively to one or more of the examples disclosed above, in some examples, the first sense connection comprises a first detour routing, the second sense connection comprises a second detour routing, and the first detour routing and the second detour routing are configured such that a resistance of the first sense connection is substantially equal to a resistance of the second sense connection. Additionally or alternatively to one or more of the examples disclosed above, in some examples, a total length of the first sense connection including the first detour routing substantially equals a total length of the second sense connection including the second detour routing. Additionally or alternatively to one or more of the examples disclosed above, in some examples, the touch screen further comprises first dummy routing coupled to the first sense connection; and second dummy routing coupled to the second sense connection, wherein the first dummy routing and the second dummy routing are configured such that a first capacitance presented by the first sense connection is substantially equal to a second capacitance presented by the second sense connection. Additionally or alternatively to one or more of the examples disclosed above, in some examples, the first and second capacitances each include a capacitance between the first sense connection and the second element, a capacitance between the first dummy routing and the second element, a capacitance between the second sense connection and the first element, and a capacitance between the second dummy routing and the first element. Additionally or alternatively to one or more of the examples disclosed above, in some examples, the first element overlaps with the second sense connection a first number of times, the first element overlaps with the second dummy routing a second number of times, the second element overlaps with the first sense connection a third number of times, the second element overlaps with the first dummy routing a fourth number of times, and a sum of the first and second numbers equals a sum of the third and fourth numbers. Additionally or alternatively to one or more of the examples disclosed above, in some examples, the first dummy routing is configured so as to not alter a first resistance of the first sense connection, and the second dummy routing is configured so as to not alter a second resistance of the second sense connection. Additionally or alternatively to one or more of the examples disclosed above, in some examples, the first sense connection comprises a first portion and a second portion, the first portion including a first number of lines, and the second portion including a second number of lines, different from the first number of lines, and the second sense connection comprises a third portion and a fourth portion, the third portion including a third number of lines, and the fourth portion including a fourth number of lines, different from the third number of lines. Additionally or alternatively to one or more of the examples disclosed above, in some examples, the first number equals the third number, and the second number equals the fourth number.

Some examples of the disclosure are directed to a method for fabricating a touch screen, the method comprising forming a first element of a plurality of elements; forming a first sense connection coupled to the first element; forming a second element of the plurality of elements; and forming a second sense connection coupled to the second element, wherein the first and second sense connections are configured such that a load presented by the first sense connection and the first element is substantially equal to a load presented by the second sense connection and the second element. Additionally or alternatively to one or more of the examples disclosed above, in some examples, the touch screen comprises a self-capacitance touch screen, and the first and second elements comprise distinct touch pixel electrodes of the self-capacitance touch screen. Additionally or alternatively to one or more of the examples disclosed above, in some examples, the first sense connection and the second sense connection are configured to couple the first element and the second element, respectively, to a location on the touch screen, and forming the first element comprises forming the first element disposed a first distance from the location on the touch screen, and forming the second element comprises forming the second element disposed a second distance from the location on the touch screen, the first distance being different than the second distance. Additionally or alternatively to one or more of the examples disclosed above, in some examples, the location comprises a flex circuit connection area. Additionally or alternatively to one or more of the examples disclosed above, in some examples, forming the first sense connection comprises forming the first sense connection including a first detour routing, forming the second sense connection comprises forming the second sense connection including a second detour routing, and the first detour routing and the second detour routing are configured such that a resistance of the first sense connection is substantially equal to a resistance of the second sense connection. Additionally or alternatively to one or more of the examples disclosed above, in some examples, a total length of the first sense connection including the first detour routing substantially equals a total length of the second sense connection including the second detour routing. Additionally or alternatively to one or more of the examples disclosed above, in some examples, the method further comprises forming first dummy routing coupled to the first sense connection; and forming second dummy routing coupled to the second sense connection, wherein the first dummy routing and the second dummy routing are configured such that a first capacitance presented by the first sense connection is substantially equal to a second capacitance presented by the second sense connection. Additionally or alternatively to one or more of the examples disclosed above, in some examples, the first and second capacitances each include a capacitance between the first sense connection and the second element, a capacitance between the first dummy routing and the second element, a capacitance between the second sense connection and the first element, and a capacitance between the second dummy routing and the first element. Additionally or alternatively to one or more of the examples disclosed above, in some examples, the first element overlaps with the second sense connection a first number of times, the first element overlaps with the second dummy routing a second number of times, the second element overlaps with the first sense connection a third number of times, the second element overlaps with the first dummy routing a fourth number of times, and a sum of the first and second numbers equals a sum of the third and fourth numbers. Additionally or alternatively to one or more of the examples disclosed above, in some examples, the first dummy routing is configured so as to not alter a first resistance of the first sense connection, and the second dummy routing is configured so as to not alter a second resistance of the second sense connection. Additionally or alternatively to one or more of the examples disclosed above, in some examples, forming the first sense connection comprises forming the first sense connection including a first portion and a second portion, the first portion including a first number of lines, and the second portion including a second number of lines, different from the first number of lines, and forming the second sense connection comprises forming the second sense connection including a third portion and a fourth portion, the third portion including a third number of lines, and the fourth portion including a fourth number of lines, different from the third number of lines. Additionally or alternatively to one or more of the examples disclosed above, in some examples, the first number equals the third number, and the second number equals the fourth number.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A touch screen comprising:
a first element of a plurality of elements, the first element coupled to a first sense connection;
a second element of the plurality of elements, the second element coupled to a second sense connection;
first dummy routing coupled to the first sense connection, the first dummy routing overlapping one or more elements of the plurality of elements; and
second dummy routing coupled to the second sense connection,
wherein the first and second sense connections and the first dummy routing are configured such that a load presented by the first sense connection and the first element is substantially equal to a load presented by the second sense connection and the second element, and
the first dummy routing and the second dummy routing are configured such that a first capacitance presented by the first sense connection is substantially equal to a second capacitance presented by the second sense connection.
2. The touch screen of claim 1, wherein:
the touch screen comprises a self-capacitance touch screen, and
the first and second elements comprise distinct touch pixel electrodes of the self-capacitance touch screen.
3. The touch screen of claim 1, wherein:
the first sense connection and the second sense connection are configured to couple the first element and the second element, respectively, to a location on the touch screen, and
the first element is disposed a first distance from the location on the touch screen, and the second element is disposed a second distance from the location on the touch screen, the first distance being different than the second distance.
4. The touch screen of claim 3, wherein the location comprises a flex circuit connection area.
5. The touch screen of claim 3, wherein the location comprises sense channels.
6. The touch screen of claim 1, wherein:
the first sense connection comprises a first detour routing,
the second sense connection comprises a second detour routing, and
the first detour routing and the second detour routing are configured such that a resistance of the first sense connection is substantially equal to a resistance of the second sense connection.

7. The touch screen of claim 6, wherein a total length of the first sense connection including the first detour routing substantially equals a total length of the second sense connection including the second detour routing.

8. The touch screen of claim 1, wherein the first and second capacitances each include:
a capacitance between the first sense connection and the second element,
a capacitance between the first dummy routing and the second element,
a capacitance between the second sense connection and the first element, and
a capacitance between the second dummy routing and the first element.

9. The touch screen of claim 1, wherein:
the first element overlaps with the second sense connection a first number of times,
the first element overlaps with the second dummy routing a second number of times,
the second element overlaps with the first sense connection a third number of times,
the second element overlaps with the first dummy routing a fourth number of times, and
a sum of the first and second numbers equals a sum of the third and fourth numbers.

10. The touch screen of claim 1, wherein the first dummy routing is configured so as to not alter a first resistance of the first sense connection, and the second dummy routing is configured so as to not alter a second resistance of the second sense connection.

11. The touch screen of claim 1, wherein:
the first sense connection comprises a first portion and a second portion, the first portion including a first number of lines, and the second portion including a second number of lines, different from the first number of lines, and
the second sense connection comprises a third portion and a fourth portion, the third portion including a third number of lines, and the fourth portion including a fourth number of lines, different from the third number of lines.

12. The touch screen of claim 11, wherein:
the first number equals the third number, and the second number equals the fourth number.

13. A method for fabricating a touch screen, the method comprising:
forming a first element of a plurality of elements;
forming a first sense connection coupled to the first element;
forming a second element of the plurality of elements;
forming a second sense connection coupled to the second element;
forming a first dummy routing coupled to the first sense connection, the first dummy routing overlapping one or more elements of the plurality of elements; and
forming second dummy routing coupled to the second sense connection,
wherein the first and second sense connections and the first dummy routing are configured such that a load presented by the first sense connection and the first element is substantially equal to a load presented by the second sense connection and the second element, and
the first dummy routing and the second dummy routing are configured such that a first capacitance presented by the first sense connection is substantially equal to a second capacitance presented by the second sense connection.

14. The method of claim 13, wherein:
the touch screen comprises a self-capacitance touch screen, and
the first and second elements comprise distinct touch pixel electrodes of the self-capacitance touch screen.

15. The method of claim 13, wherein:
the first sense connection and the second sense connection are configured to couple the first element and the second element, respectively, to a location on the touch screen, and
forming the first element comprises forming the first element disposed a first distance from the location on the touch screen, and forming the second element comprises forming the second element disposed a second distance from the location on the touch screen, the first distance being different than the second distance.

16. The method of claim 15, wherein the location comprises a flex circuit connection area.

17. The method of claim 13, wherein:
forming the first sense connection comprises forming the first sense connection including a first detour routing,
forming the second sense connection comprises forming the second sense connection including a second detour routing, and
the first detour routing and the second detour routing are configured such that a resistance of the first sense connection is substantially equal to a resistance of the second sense connection.

18. The method of claim 17, wherein a total length of the first sense connection including the first detour routing substantially equals a total length of the second sense connection including the second detour routing.

19. The method of claim 13, wherein the first and second capacitances each include:
a capacitance between the first sense connection and the second element,
a capacitance between the first dummy routing and the second element,
a capacitance between the second sense connection and the first element, and
a capacitance between the second dummy routing and the first element.

20. The method of claim 13, wherein:
the first element overlaps with the second sense connection a first number of times,
the first element overlaps with the second dummy routing a second number of times,
the second element overlaps with the first sense connection a third number of times,
the second element overlaps with the first dummy routing a fourth number of times, and
a sum of the first and second numbers equals a sum of the third and fourth numbers.

21. The method of claim 13, wherein the first dummy routing is configured so as to not alter a first resistance of the first sense connection, and the second dummy routing is configured so as to not alter a second resistance of the second sense connection.

22. The method of claim 13, wherein:
forming the first sense connection comprises forming the first sense connection including a first portion and a second portion, the first portion including a first number of lines, and the second portion including a second number of lines, different from the first number of lines, and
forming the second sense connection comprises forming the second sense connection including a third portion and a fourth portion, the third portion including a third number of lines, and the fourth portion including a fourth number of lines, different from the third number of lines.

23. The method of claim 22, wherein:
the first number equals the third number, and the second number equals the fourth number.

24. The touch screen of claim 1, wherein:
the first sense connection is disposed along a first axis on the touch screen between a first location and a second location,
the first sense connection is coupled to sense circuitry at the first location,
the first dummy routing is coupled to the first sense connection at the second location, and
the first dummy routing is disposed along the first axis.

25. The touch screen of claim 1, wherein:
the first sense connection comprises a first conductive trace pattern, and
the first dummy routing comprises a second conductive trace pattern, corresponding to the first conductive trace pattern.

26. The touch screen of claim 25, wherein:
the first sense connection comprises a first number of parallel first conductive traces, and
the first dummy routing comprises the first number of parallel second conductive traces.

27. The touch screen of claim 1, wherein:
the first and second sense connections and the first dummy routing are configured such that a resistive and capacitive load presented by the first sense connection and the first element is substantially equal to a resistive and capacitive load presented by the second sense connection and the second element.

28. The touch screen of claim 10, wherein:
the first sense connection is configured to conduct a DC electrical current, and
the first dummy routing is configured not to conduct a DC electrical current.

29. The method of claim 13, wherein
the first sense connection is disposed along a first axis on the touch screen between a first location and a second location,
the first sense connection is coupled to sense circuitry at the first location,
the first dummy routing is coupled to the first sense connection at the second location, and
the first dummy routing is disposed along the first axis.

30. The method of claim 13, wherein
the first sense connection comprises a first conductive trace pattern, and
the first dummy routing comprises a second conductive trace pattern, corresponding to the first conductive trace pattern.

31. The method of claim 30, wherein
the first sense connection comprises a first number of parallel first conductive traces, and
the first dummy routing comprises the first number of parallel second conductive traces.

32. The method of claim 13, wherein:
the first and second sense connections are configured such that a resistive and capacitive load presented by the first sense connection and the first element is substantially equal to a resistive and capacitive load presented by the second sense connection and the second element.

33. The method of claim 21, wherein:
the first sense connection is configured to conduct a DC electrical current; and
the first dummy routing is configured not to conduct a DC electrical current.

* * * * *